3,293,132
SPRAY DRIED VITAMIN COMPOSITIONS AND
METHOD OF PREPARATION
Lewis E. Stoyle, Jr., South Plainfield, and Edward J. Hanus, Palisade, N.J., assignors to Merck & Co., Inc., Rahway, N.J., a corporation of New Jersey
No Drawing. Filed Mar. 25, 1963, Ser. No. 267,843
16 Claims. (Cl. 167—82)

This invention relates generally to improvements in vitamin preparations and to improvements in molded products prepared therefrom. In particular, this invention relates to preparations of ascorbic acid in a dry, free-flowing form especially suitable for tableting by direct compression, and to tablets so produced.

In the pharmaceutical industry, it is a well known fact that very few crystalline or powdered materials can be directly compressed into suitable tablets on conventional tableting equipment. This is particularly true in the case of ascorbic acid (Vitamin C).

At the present time, there are two well-known methods of preparing vitamin and multi-vitamin tablets, namely, the wet granulation method and the dry granulation method (also known as "slugging"). Both these methods require the material forming the tablets to be formed into granules of predetermined size prior to compressing the material into a coherent mass of the shape of the finished tablet. Both processes, however, possess many disadvantages and leave much to be desired.

In accordance with the slugging process, the various ingredients, in intimately admixed powdered form, are subjected to high pressures to produce large slugs of the material as a cohered solid mass. These slugs are then milled into granules of the desired size and configuration, the granules being thereafter recompressed in the conventional tablet-forming equipment to produce the finished product. The slugging process is generally employed where the tablet ingredients may not be wetted due to some incompatibility or where they are heat-sensitive and unstable. It is an expensive process which involves considerable labor and equipment and its application is limited and not always satisfactory.

In the wet granulating process, the ingredients which enter into the tablet are wetted down with a wetting agent which generally consists of water, alcohol or other organic solvent with or without water, gum or other binder solutions, for example, acacia, tragacanth, gelatin, cellulose acetate hydrogen phthalate, etc. The tablet ingredients, wetted as above, to the proper consistency are placed in a suitable drying oven. The dried solid cohered mass is then milled into granules of the required size, admixed with a suitable lubricant and formed into tablets as in the case of the slugging process. The wet granulating process is likewise expensive, requiring considerable labor, equipment and expenditure of energy. Moreover, where organic solvents are employed, these are evaporated and seldom recovered, thus adding to the production costs. The use of organic solvents also requires certain safety precautions, e.g., explosion-proof electrical installations such as explosion-proof motors, lighting, sockets, etc., all of which adds further to the cost of production. The wet granulating process cannot be used when the tablet ingredients are incompatible to wetting or are heat-sensitive.

Prior to this invention, tablets of ascorbic acid were preferably made by the dry slugging procedure. Typically, a powdered mixture of superfine ascorbic acid with lubricants and suitable diluents such as lactose, sucrose or cornstarch is slugged, reduced to approximately 12-mesh granules, and recompressed into tablets of appropriate size. A less favored alternative method utilized the wet granulation technique and consisted of preparing a blank granulation, such as one made by wetting a mixture of about 10 parts of lactose and 3.5 parts of cornstarch with a paste containing 10 percent cornstarch and 10 percent sucrose. The wet mass is forced through an 8-mesh stainless steel screen and dried at 40° C. The dried mass is reduced to 12- to 14-mesh granules and then mixed with the ascorbic acid (30 to 80 mesh) and approximately 0.5 percent magnesium stearate as a lubricant. This mixture is then compressed into tablets of suitable size.

In both these methods, the amount of equipment, labor, floor space, cost and time required is substantial. In comparison, the present invention permits the preparation of tablets containing ascorbic acid by direct compression, which method would involve only two essential steps, namely, the preparation of the powdered blend of tablet ingredients and the compression thereof into tablets, thereby resulting in substantial economic savings. Furthermore, this reduces processing time and eliminates granulating procedures which can be deleterious to ascorbic acid since it is subject to oxidative degradation. In addition, ascorbic acid, as commercially available, has very poor flow properties and compression characteristics which makes the manufacture of tablets according to the aforementioned granulation procedures difficult, particularly at high dosage levels (about 250–500 mgs. per tablet). On the other hand, the use of the ascorbic acid preparation of this invention simplifies tablet production at all dosage levels. Thus, tablets containing high concentrations of ascorbic acid, which were previously difficult to make, can now be easily manufactured by direct compression techniques. Accordingly, it will be readily apparent that a method for the direct compression of ascorbic acid tablets and tablets containing other medicinal agents with ascorbic acid, whereby numerous steps inherent in the wet and dry granulation methods presently employed for the preparation of said tablets are eliminated, would result in a vast reduction in the amount of equipment, labor, space, cost and time required and would be most welcomed by the pharmaceutical industry.

An object of this invention, therefore, is to provide dry, stable ascorbic acid preparations having good flow properties and compression characteristics in tableting procedures.

Another object is to provide a spray dried ascorbic acid preparation suitable for tableting by direct compression.

Still another object is to provide an improved molded product comprising ascorbic acid and an improved method for producing the same.

A further object is to provide a method of making tablets comprising ascorbic acid by direct compression.

An additional object is to provide a method of making multi-vitamin tablets containing ascorbic acid by direct compression.

Further objects and features of advantage will be found in the detailed description of the invention which follows.

In accordance with the present invention, a method is now provided whereby molded products, particularly tablets, comprising ascorbic acid can be satisfactorily prepared by direct compression on conventional tableting equipment. The present invention is based upon the discovery that a certain novel spray dried ascorbic acid preparation, described more fully hereinafter, has exceptional compressibility characteristics which permit it to be compressed into tablets on conventional tableting equipment without the necessity of prior granulation or slugging steps as in the wet and dry methods of tableting described hereinabove. In preparing ascorbic acid tablets, all that is now required is that the spray dried ascorbic acid preparation, admixed with any of the usual lubricants used in tableting procedures such as stearic acid, magnesium stearate, sodium stearate, polyethylene glycol 4000, polyethylene glycol 6000, hydrogenated vegetable oils, talc and the like, be fed directly to the conventional tableting press and therein molded to the desired size and shape. Molded products containing additional active ingredients other than and compatible with ascorbic acid, together with any required diluents, stabilizing agents, coloring agents, flavoring agents, etc., may now be prepared by direct compression techniques also, in which case it has been found that, when the subject spray dried ascorbic acid preparation is used as the sole tablet binder, the additional ingredients may comprise up to 90 percent by weight of the formula, depending upon the physical characteristics of said ingredients, although it is preferred that at least 30 percent by weight of the tablet consist of the spray dried ascorbic acid preparation.

The novel spray dried ascorbic acid preparation of this invention comprises the following composition, expressed in parts by weight:

|  | Allowable Range | Preferred Range |
| --- | --- | --- |
| Ascorbic Acid | 75-95 | 85-95 |
| Carbohydrate | 5-25 | 5-15 |
| Binder | 0.5-7 | 0.5-3 |

To prepare this material, the carbohydrate and binder are dissolved in enough water to make a finished feed slurry (including the ascorbic acid) of about 40 to 60 percent solids by weight and, preferably, about 50 percent solids. The ascorbic acid is then added and agitated to form a homogenous suspension which is then spray dried to form a powder by conventional spray drying operations. Among the carbohydrates that may be used in preparing the spray dried ascorbic acid preparation of this invention are sugars, such as, for example, lactose, sucrose, maltose, glucose, mannose, fructose, arabinose, and the like; non-sugars, such as, for example, pectin, starch, and the like; closely related polyhydric alcohols containing from 4 to 6 hydroxyl radicals, such as, for example, mannitol, dulcitol, sorbitol, and the like; and mixtures of any of the foregoing. Typical binders that are operable herein include film-producing hydrophylic organic colloidal materials such as, for example, proteins such as gelatin, water-soluble derivatives of casein, e.g., sodium caseinate, and the like; water-soluble gums such as gum acacia, gum karaya, gum ghatti, tragacanth, and the like; and water-soluble derivatives of cellulose such as methylcellulose, hydroxyethyl cellulose, sodium carboxy methylcellulose, and the like. For this purpose, use may furthermore be made of certain polyvinyl resins such as, for example, polyvinyl alcohol, polyvinyl pyrrolidine and the like.

In general, the spray drying operation is carried out by atomizing the suspension and then contacting the atomized particles with a drying gas which is introduced into the drier at a temperature usually higher than the temperasure of the liquid material being sprayed. For the purposes of this invention, with the ascorbic acid suspension at ambient temperature, inflow and outflow temperatures of the drying gas passing through the drier of about 375° F. and 185° F., respectively, have advantageously been used.

A suitable apparatus for carrying out the spray drying operations is any standard powdered milk spray drier. Such drier should comprise a suitable chamber having one or more conduits providing for the introduction of hot air or like drying gases. If a cone type drier is used, it may have at or near the axis thereof a centrifugal atomizer to which the suspension is supplied. In place of a centrifugal atomizer, other types of atomizing equipment can be employed such as, for instance, a high pressure pump for delivering the material through an atomizing nozzle inserted in the top chamber of a hot-air spray drier. The suspension emitting from the nozzle is atomixed into small particles from which the water is rapidly removed as the particles come in contact with the drying gas. The resulting powdery product falls by gravity to the bottom chamber, whence it may be removed continuously by a moving belt and carried to a storage hopper.

The spray dried ascorbic acid product which comes from the drying chamber is in the form of a fine white powder which is composed essentially of spheroidal particles having an average moisture content of about 0.1 to 1.0% and an average particle size distribution equal to:

100% through 20 mesh sieve
90% through 80 mesh sieve
55% through 150 mesh sieve

The spray dried ascorbic acid preparation is characterized by being free-flowing, stable, easily compressible and readily admixable with other ingredients while maintaining its high flow properties thereby to permit the satisfactory feeding and handling of the mixture in the tableting machine.

In producing the tablets, the spray dried ascorbic acid preparation is intimately admixed, by any well-known apparatus, with a conventional lubricating agent, such as, for example, stearic acid, magnesium stearate, talc, sodium stearate, and the like including mixtures thereof, to promote the flow of powder in the hopper and to prevent it from sticking in the tablet punch when compressed, and one or more other active ingredients that may be desired in the final formulation, which ingredients may be almost any pharmaceutically active materials, e.g., other vitamins or dietary supplements, antihistamines, decongestants, analgesics, etc., as long as they are compatible with ascorbic acid. In addition, other excipients such as, for example, anti-caking agents such as colloidal cilica, fillers such as lactose, and disintegrating agents such as starch, may if desired, be added to the blend prior to compression. The resulting mixture is then fed to and directly compressed on conventional tableting equipment, e.g., single or rotary tablet punching machines, where tablets of the desired sizes and shapes are molded in the usual manner.

That the spray dried ascorbic acid preparation of this invention and the use made thereof in direct tableting procedures is indeed a worthwhile advance in the art can be readily appreciated from the fact that a simple blend of ascorbic acid, lactose, methylcellulose and a lubricant could not be heretofore directly compressed into a tablet due to splitting, crumbling, laminating, capping and punch build-up.

The particle size of the spray dried ascorbic acid preparation and other materials to be included in the finished tablet prior to compression is preferably of the same order of magnitude and within the range of from about 20 mesh to about 200 mesh for optimum results. However, particle sizes as large as 12 mesh are satisfactory. As indicated above, it is preferable that the particle size of all the components be of approximately the same size of magnitude. Accordingly, it will be readily appreciated that the spray dried ascorbic acid preparation and each of the other tablet ingredients may, if necessary, be reduced to the desired particle size separately or, more desirably, they may be reduced simultaneously after blending and before compression.

The following examples illustrate methods of carrying out the present invention but it is to be understood that these examples are given for purposes of illustration and not of limitation.

*Example 1*

| | |
| --- | --- |
| Ascorbic acid, grams | 900 |
| Lactose, grams | 90 |
| Methylcellulose (10 cps.), grams | 10 |
| Water, mls. | 1000 |

The lactose and methylcellulose are dissolved in the 1000 mls. of water and the ascorbic acid is then added with agitation to form a homogenous suspension. This suspension is then put through a spray dryer for rapid withdrawal of its water content. The resulting product is a free-flowing white powder having a particle size distribution as follows:

100% through 20 mesh sieve
90% through 80 mesh sieve
55% through 150 mesh sieve

The spray dryer used herein is a Nerco Niro Laboratory Spray Dryer, minor type 53, with an air-powered centrifugal wheel atomizer and an electric air heater operating under the following conditions:

| | |
|---|---|
| Inlet temperature, °F. | 360 |
| Outlet temperature, °F. | 185 |
| Wheel speed, r.p.m. | 38,000 |
| Feed rate (gravity feed), cc./hr. | 500 |

*Example 2*

| | Parts by weight per tablet, mgms. |
|---|---|
| Spray dried ascorbic acid preparation of Example 1 | 610 |
| Magnesium stearate | 12 |

Vitamin tablets of the above composition are prepared by direct compression in the following manner. The ingredients are intimately blended together and directly compressed on a rotary tablet press using 14/32 inch standard cup punches.

*Example 3*

A.

| | |
|---|---|
| Ascorbic acid, grams | 95 |
| Powdered sucrose, grams | 25 |
| Methylcellulose (10 cps.), grams | 3 |
| Water, mls. | 120 |

B.

| | |
|---|---|
| Ascorbic acid, grams | 85 |
| Lactose, grams | 15 |
| Acacia gum, grams | 5 |
| Water, mls. | 85 |

C.

| | |
|---|---|
| Ascorbic acid, grams | 75 |
| Sucrose, grams | 5 |
| Methylcellulose (10 cps.), grams | 0.5 |
| Water, mls. | 95 |

D.

| | |
|---|---|
| Ascorbic acid, grams | 90 |
| Lactose, grams | 12 |
| Acacia gum, grams | 2 |
| Water, mls. | 115 |

E.

| | |
|---|---|
| Ascorbic acid, grams | 90 |
| Lactose, grams | 10 |
| Gelatin, grams | 3 |
| Water, mls. | 100 |

F.

| | |
|---|---|
| Ascorbic acid, grams | 75 |
| Sucrose, grams | 20 |
| Gelatin, grams | 5 |
| Water, mls. | 100 |

Each of the combinations of ingredients in the above formulations A–F are mixed to form homogenous suspensions which are then spray dried as in Example 1. Each spray dried product is thoroughly admixed with 2 percent by weight of magnesium stearate and the resulting mixtures are directly compressed into tablets on a rotary tablet press using 14/32 inch standard cup punches.

In accordance with the procedures of this example, but substituting equivalent quantities of polyvinyl alcohol and polyvinyl pyrrolidine, respectively, for the binder materials in the above formulations, similar spray dried products are obtained which can be directly compressed into tablets.

*Example 4*

| | Parts by weight per tablet, gram |
|---|---|
| Spray dried ascorbic acid preparation of Example 1 | 0.555 |
| Pyrilamine resin adsorbate | 0.204 |
| Aspirin | 3.000 |
| Magnesium stearate | 0.750 |

The above ingredients are intimately blended together and directly compressed on a rotary tablet press using 14/32 inch standard cup punches.

*Example 5*

Multi-vitamin tablets having the following composition are prepared by direct compression in the following manner:

| | Parts by weight per tablet |
|---|---|
| Spray dried ascorbic acid preparation of Example 1, mgms. | 66.67 |
| Thiamine mononitrate, mgms. | 2.6 |
| Riboflavin, mgms. | 2.1 |
| Cyanocobalamin, (0.1% in gelatin), mgms. | 2.2 |
| Pyridoxine HCl, mgms. | 2.1 |
| d-Calcium pantothenate, mgms. | 5.0 |
| Vitamin A acetate (500 units per mg.), units | 6750 |
| Vitamin D (50 units per mg.), units | 675 |
| Colloidal silica (Cab-O-Sil), mgms. | 1.0 |
| Crystalline cellulose (Avicel), mgms. | 20.75 |
| Magnesium stearate, mgms. | 3.0 |
| Spray dried lactose, mgms. | 14.09 |
| Niacinamide, mgms. | 22.0 |

All of the vitamin ingredients, except vitamins A and D, and the magnesium stearate, cellulose and lactose are blended together and milled through a hammer mill to ensure uniformity. The vitamins A and D are then added to the blend, mixed, and the mixture is directly compressed on a rotary tablet press using 8/32 inch standard cup punches. The use of commercially available ascorbic acid powder in the above formulation in place of the spray dried ascorbic acid preparation of this invention does not afford a satisfactory tablet by direct compression.

Various changes and modifications may be made in carrying out the present invention without departing from the spirit and scope thereof. Insofar as these changes and modifications are within the purview of the annexed claims, they are to be considered as part of our invention.

We claim:

1. A spray dried powder having free-flowing properties and which is directly compressible into tablets, comprising from 75 to 95 parts by weight of ascorbic acid, from 5 to 25 parts by weight of a carbohydrate, and from 0.5 to 5 parts by weight of a film-producing hydrophylic organic colloidal material.

2. A spray dried powder of claim 1 wherein said colloidal material is selected from the group consisting of proteins, water-soluble gums, water-soluble derivatives of cellulose, polyvinyl alcohol and polyvinyl pyrrolidine.

3. A spray dried powder according to claim 1 in which the carbohydrate is a sugar.

4. The spray dried powder of claim 3 wherein said sugar is selected from the group consisting of lactose and sucrose.

5. A spray dried powder according to claim 1 in which said colloidal material is methylcellulose.

6. A spray dried powder according to claim 1 in which said colloidal material is acacia gum.

7. A spray dried powder according to claim 1 in which said colloidal material is gelatin.

8. A method for the preparation of tablets which comprises directly compressing into tablets a spray dried powder comprising from 75 to 95 parts by weight of ascorbic acid, from 5 to 25 parts by weight of a carbohydrate, and from 0.5 to 5 parts by weight of a film-producing hydrophylic organic colloidal material.

9. The method of claim 8 wherein the spray dried powder comprises at least one other medicinal ingredient.

10. The method of claim 8 wherein the spray dried powder comprises at least one other vitamin.

11. A method for the preparation of tablets which comprises directly compressing a spray dried powder comprising from 75 to 95 parts by weight of ascorbic acid, from 5 to 25 parts by weight of a sugar, and from 0.5 to 5 parts by weight of a film-producing hydrophylic organic colloidal material in the presence of a lubricating agent.

12. The method of claim 11 wherein said sugar is selected from the group consisting of lactose and sucrose.

13. The method of claim 11 wherein said colloidal material is selected from the group consisting of proteins, water-soluble gums, water-soluble derivatives of cellulose, polyvinyl alcohol and polyvinyl pyrrolidine.

14. A method for the preparation of tablets which comprises directly compressing into tablets a spray dried powder comprising from 75 to 95 parts by weight of ascorbic acid, from 5 to 25 parts by weight of a sugar and from 0.5 to 5 parts by weight of methylcellulose.

15. A method for the preparation of tablets which comprises directly compressing into tablets a spray dried powder comprising from 75 to 95 parts by weight of ascorbic acid, from 5 to 25 parts by weight of a sugar and from 0.5 to 5 parts by weight of acacia gum.

16. A method for the preparation of tablets which comprises directly compressing into tablets a spray dried powder comprising from 75 to 95 parts by weight of ascorbic acid, from 5 to 25 parts by weight of a sugar and from 0.5 to 5 parts by weight of gelatin.

References Cited by the Examiner

UNITED STATES PATENTS

| | | | |
|---|---|---|---|
| 3,079,303 | 2/1963 | Raff et al. | 167—82 |
| 3,116,204 | 12/1963 | Siegel | 167—81 |
| 3,200,039 | 8/1965 | Thompson | 167—82 |

JULIAN S. LEVITT, *Primary Examiner.*

FRANK CACCIAPAGLIA, Jr., *Examiner.*

GEORGE A. MENTIS, *Assistant Examiner.*